Figure 1:
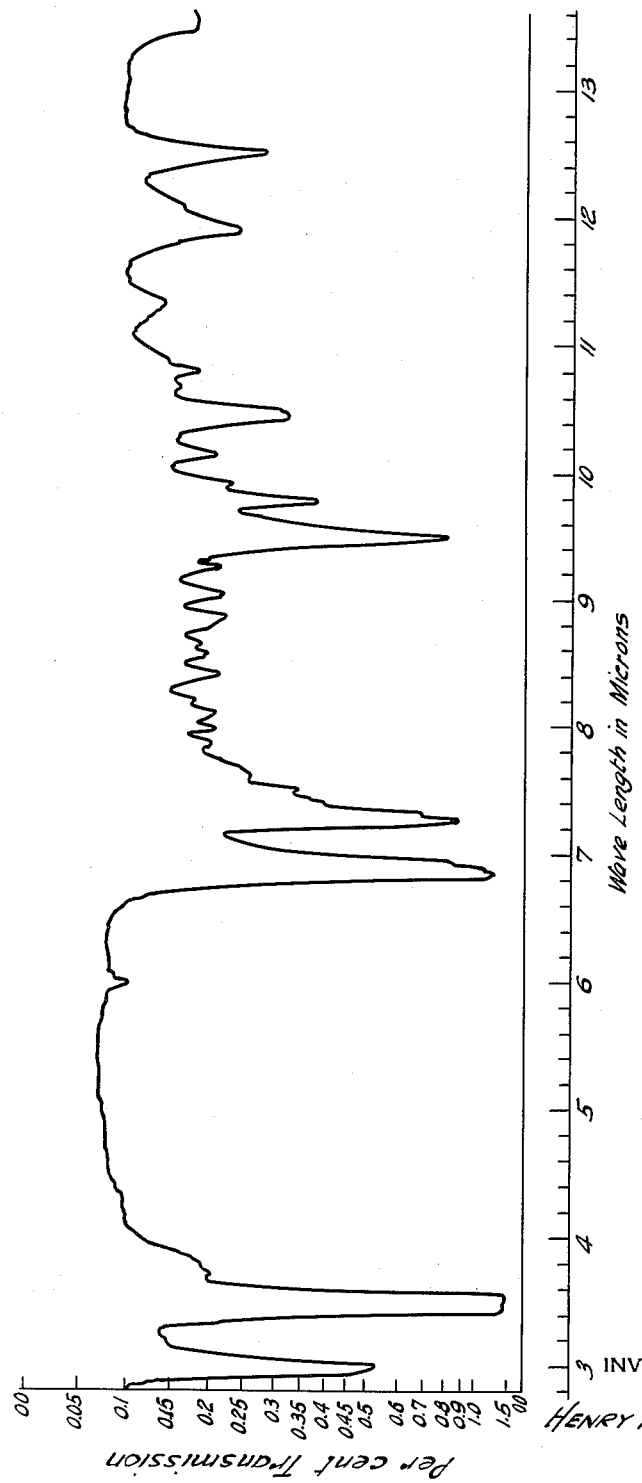

May 15, 1962 H. K. WACHTEL 3,034,963
BLOOD CHOLESTEROL REDUCING SUBSTANCE
AND METHOD OF PRODUCING THE SAME
Filed Jan. 28, 1957 2 Sheets-Sheet 1

INVENTOR
HENRY K. WACHTEL

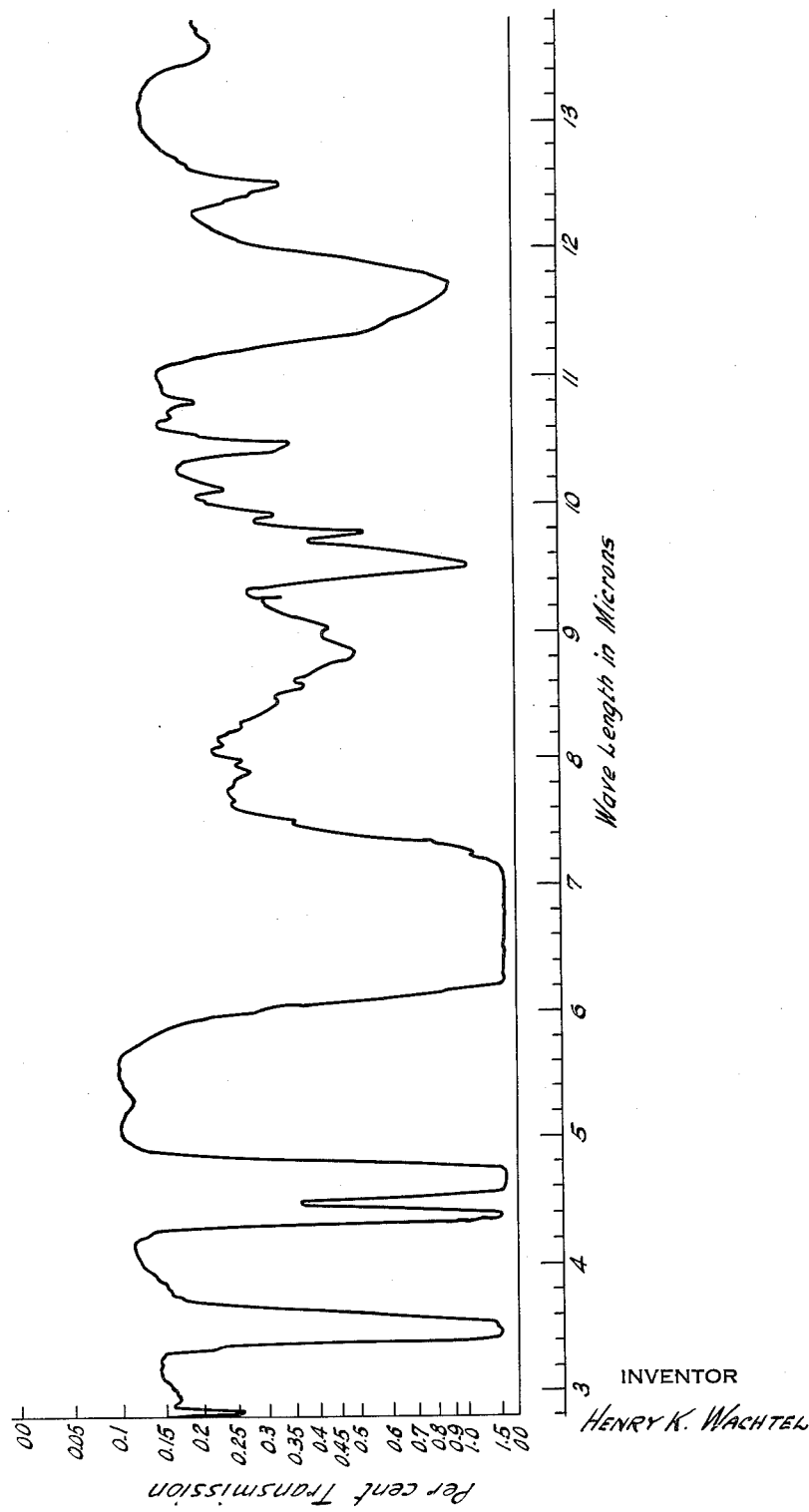

3,034,963
BLOOD CHOLESTEROL REDUCING SUBSTANCE AND METHOD OF PRODUCING THE SAME
Henry K. Wachtel, 34 E. 68th St., New York, N.Y.
Filed Jan. 28, 1957, Ser. No. 636,564
4 Claims. (Cl. 167—74)

This invention relates to a substance capable of lowering the concentration of cholesterol in the blood of animals and to a process of producing the same.

Both cholesterol and phospholipids have been correlated with a number of diseases. Arteriosclerosis, lipoid nephrosis, lipoidosis and Neiman-Pick disease have been directly attributed to the increase or decrease of cholesterol and phospholipids in blood; however, the exact relation of each to the various diseases has not been clearly established. It is known that the body mechanisms which regulate the concentration of cholesterol and phospholipids in the blood of animals are different and it would be a valuable aid in the study of the mechanism controlling the concentration of cholesterol to be able to lower the concentration of cholesterol in the blood of an animal and to determine the effect of the lowered concentration on cholesterol concentration in other parts of the animal body. It would also be very useful to be able to lower the concentration of cholesterol in the blood of animals and then determine the ability of various foods and drugs to raise the concentration of cholesterol in the blood. Such studies would give an insight into cholesterol metabolism and the body mechanism controlling the concentration of cholesterol in the blood. The results of such studies would be more accurate if the substance used for lowering the concentration of cholesterol in the blood of animals were chemically pure and free from substances which affect the concentration of other substances in blood and particularly a substance having the ability to lower the concentration of phospholipids but having the property of lowering the concentration of cholesterol in the blood of animals, such substance being derived from the glandular and central nervous system organs of mammals, birds and fishes.

Also, in accordance with the invention, a process is provided for producing the blood cholesterol lowering substance from glandular and central nervous system organs of mammals, birds and fishes, and particularly from the anterior and posterior lobes of the pituitary gland, liver, adrenal gland, pancreas, brain and spinal cord of animals. In general, the process of this invention comprises extracting a finely divided organ from the glandular or central nervous system of mammals, birds and fishes at a pH between about 7 and about 7.6 with a solvent such as petroleum ether, ethyl ether, a liquid, water-miscible monohydric alcohol, a polyhydric alcohol, a ketone or a mixture of such solvents, the alcohols and ketones having no functional group other than the hydroxyl or carbonyl groups, removing the fraction soluble in the solvent, treating the said fraction in dry form with chloroform, separating the chloroform soluble portion from the chloroform insoluble portion, dissolving the chloroform insoluble portion in a solvent such as petroleum ether, ethyl ether or methanol, and subjecting the resulting solution to chromatographic separation. If a water-miscible alcohol or ketone is used in the first extracting solution it must be liquid at room temperature (15° C.). To effect more efficient extraction the organ is preferably very finely divided prior to this treatment. The pH of the comminuted organ to be extracted is between about 7 and 7.6; if the pH is below or above this range, the amount of blood cholesterol lowering substance obtained is markedly reduced. Five to six cc. of chloroform are used in extracting each gram of dry residue obtained from evaporating the solvent extract of the comminuted organ. If the amount of chloroform used is less than five cc. per gram of dry residue, the chloroform insoluble portion contains a large amount of inactive material and if the amount of chloroform is greater than about 6 cc. per gram of dry substance, only a slight amount of blood cholesterol lowering substance is obtained. It is preferred that about 100 cc. of solvent be used to dissolve each gram of the chloroform insoluble portion since the blood cholesterol lowering substance is more sharply separated from contaminating substances upon chromatographic operation by the use of a solution of this concentration. The various substances in solution in the solvent become concentrated at different levels in the chromatographic column. After the solution of chloroform insoluble substance has been poured on the column and allowed to develop, the column is cut into three portions of approximately equal sizes and the middle portion, which contains the blood cholesterol lowering substance, is separated and extracted with a solvent such as ethyl ether, petroleum ether, methanol or a liquid, water-miscible alcohol or ketone. The solution, which contains the blood cholesterol lowering substance, as well as a substance capable of lowering the concentration of phospholipids in the blood of animals, is again passed through a chromatographic column in order to remove the latter substance. The middle third of the second chromatographic column is extracted with a solvent as in the first instance and the solvent is removed by evaporation under reduced pressure. The residue is a substantially pure, colorless crystalline substance and may be recrystallized from ethyl ether or petroleum ether (B.P. 30°–60° C.). The chromatographic procedure may be repeated and with each repetition the blood cholesterol lowering substance is obtained in a more pure form.

Any of the usual sorption materials employed in chromatography may be utilized in the process of this invention; alumina, calcium carbonate and silica being particularly suitable substances.

Examples of the water-miscible monohydric or polyhydric alcohols or ketones are methanol, ethanol, propanol, isopropanol, butanol, pentanol, acetone, methylisobutyl ketone, ethylene glycol and propylene glycol.

The blood cholesterol lowering substance of this invention may be administered to an animal parenterally by injecting a solution of the substance in a fatty acid glyceride, such as sesame, or olive oil. The concentration of the substance in the solvent may vary over wide limits; however, a concentration of 0.1 to 25 mgs. of the substance per cc. of solvent and preferably 1 to 15 mgs. of the substance per cc. of the solvent is satisfactory to depress the cholesterol content of the blood of the animal into which it is injected.

A more comprehensive understanding of the invention is obtained by reference to the following examples:

*Example I*

500 grams of the posterior lobe of the pituitary glands from cattle were minced with a meat chopper and two liters of acetone were added to the minced glands. The mixture was permitted to stand at room temperature in darkness for a period of one week. The supernatant liquid was then drawn off and the residue was discarded. The solvent in the supernatant liquid was removed by evaporation under reduced pressure and one-half liter of chloroform was added to the residue, the amount of chloroform added being in the proportion of 6 cc. for each gram of residue. The chloroform-residue mixture was agitated for fifteen minutes and filtered through double filter paper (Whatman No. 42). The chloroform insoluble material which collected on the filter was dissolved in petroleum ether having a boiling point of 30° to 60°. The amount of petroleum ether added was in the proportion of 100 cc. for each gram of chloroform insoluble residue. The solution of chloroform insoluble substance in petroleum ether was passed through a chromatographic column consisting of calcium carbonate which had been heated to a temperature of about 150° C. prior to being introduced into the column. The middle third of the chromatographic column, in which the blood cholesterol lowering substance was concentrated, was separated and extracted with petroleum ether having a boiling point of 30° to 60° C. The amount of petroleum ether used was equal in volume to that used in dissolving the chloroform insoluble residue. The petroleum ether solution was subjected to chromatographic adsorption by being passed through a second calcium carbonate column which had been prepared in the same manner as above. The middle third of the chromatographic column was separated, extracted with petroleum ether and the petroleum ether was evaporated under reduced pressure. The residue, which was in the form of colorless crystals, was recrystallized from ethyl ether.

Elementary qualitative analysis of the crystalline substance showed the absence of nitrogen, phosphorus, sulfur and halogens. A chloroform solution of the crystalline substance gave a red color with concentrated sulphuric acid which changed to purple on the addition of formaldehyde, this being an indication of unsaturation in the molecule. A test of the crystalline substance with 2,4-dinitrophenylhydrazine showed no indication of ketonic properties. There was no indication of the presence of ester groups in the crystalline substance when it was tested by the hydroxamic test. The ferric chloride test showed the absence of phenols in the crystalline substance. The absence of any basic groups in the crystalline substance was indicated by a test with nickel dimethylglyoxine equilibrium solution. The crystalline substance had a melting point of 147° to 150° C. and sublimed at 140° C. under vacuum. The sublimate had a melting point at 147° to 150° C. The crystalline substance had a carbon content of 83.46%, a hydrogen content of 11.41%, and a molecular weight of 361.

The crystalline substance exhibited a characteristic absorption curve in the infra-red region of the spectrum.

FIGURE 1 is a reproduction of the most characteristic part of the infra-red absorption spectrum of the substance mulled in pure hydrocarbon oil. FIGURE 2 is a reproduction of the most characteristic part of the infrared absorption spectrum of the substance in solution in carbon disulphide. The curves of FIGURES 1 and 2 were obtained by an absorbency recording spectrophotometer using a rock salt prism with radiation passing through the samples of the substance mulled in pure hydrocarbon oil and dissolved in carbon disulphide. The most characteristic maximum absorption for the substance mulled in a pure hydrocarbon oil occurred at the following wave lengths in microns: 3.00, 6.00, 7.46, 7.62, 7.87, 7.99, 8.10, 8.26, 8.41, 8.56, 8.84, 9.05, 9.25, 9.48, 9.79, 9.84, 10.14, 10.44, 10.80, 11.33, 11.90, 12.52, 13.52.

The most characteristic maximum absorptions occurred at the following wave lengths in microns for the substance dissolved in carbon disulphide: 2.81, 7.23, 7.28, 7.31, 7.52, 7.68, 7.89, 7.97, 8.11, 8.24, 8.44, 8.47, 8.83, 9.04, 9.24, 9.54, 9.78, 9.89, 10.14, 10.49, 10.81, 12.51, 13.60.

The blood cholesterol lowering substance prepared according to the procedure of Example I had the following specific rotation:

$[\alpha]_D^{28}$ in chloroform (c.=2%), −39.75°

The blood cholesterol lowering substance of this invention has the following probable empirical formula: $C_{25}H_{42}O$.

In each figure, the regions obscured by the solvent absorption are indicated.

The following examples show the effect of the blood cholesterol lowering substance on the concentration of cholesterol in the blood of a dog and a rat and also the effect of a lowered concentration of blood cholesterol on the concentration of cholesterol in the liver of the rat.

*Example II*

A normal fasting, male dog, weighing twenty-two pounds, was injected subcutaneously with ten milligrams of the crystalline substance obtained according to the procedure of Example I which was dissolved in one cc. of sesame oil. The concentration of cholesterol in the blood of the animal treated was determined before the injection and at 24 hour intervals on consecutive days thereafter. The concentration of blood cholesterol before injection and at intervals thereafter is given below in tabular form, the concentration of cholesterol being given in milligram per cent, i.e., milligrams per hundred grams:

Before the injection—192.0
24 hours after the injection—98.0
48 hours after the injection—87.0
72 hours after the injection—103.0
96 hours after the injection—141.0
120 hours after the injection—179.0

*Example III*

An adult, male rat, weighing 175 grams, was injected subcutaneously with a solution in 0.5 cc. sesame oil of 20 milligrams of the blood cholesterol lowering substance obtained according to the procedure of Example I. The injected rat and a second adult, male rat, weighing 178 grams, which had not been injected, were sacrificed twenty-four hours after the second injection. The concentration of cholesterol in the blood of both sacrificed rats was determined. The concentration of cholesterol in the blood of the control rat was 96 milligram percent and the concentration of cholesterol in the blood of the injected rat was 66 milligram percent. The concentration of cholesterol in the liver of both sacrificed rats was also determined. The concentration of cholesterol in the liver of the control rat which weighed 11.75 grams was 270 milligrams percent and the concentration of cholesterol in the liver of the injected rat, which weighed 11.85 grams was 164 milligram percent.

The blood cholesterol lowering substance prepared according to the procedure of Example I had no effect on the concentration of phospholipids in the blood of dogs and rats upon subcutaneous injection of a solution of twenty milligrams of the substance in 0.5 cc. of sesame oil.

The cholesterol determinations of Examples II and III were made according to the method of Schoenheimer, R. and Sperry, W. M., J.B.C., 108, 745 (1934).

What is claimed is:

1. A process for producing a substance capable of lowering the concentration of cholesterol in the blood of animals from an organ selected from the group consisting of the anterior and posterior lobes of the pituitary gland, the liver, and the brain of mammals, birds and fishes, which comprises treating the finely divided organ at a pH within the range of about 7.0 to about 7.6 with an organic solvent, selected from the class consisting of petroleum ether, ethyl ether, a liquid water-miscible monohydric alcohol, a polyhydric alcohol, an aliphatic low molecular weight ketone, and a mixture of said solvents, the alcohols and ketones having no functional groups other than hydroxyl and carbonyl groups, removing the fraction soluble in the solvent, removing the solvent, adding chloroform to the residue obtained by removing the solvent in the amount of between 5 and 6 cc. of chloroform per gram of residue, separating the chloroform insoluble material from the resulting mixture, passing a solution of the chloroform insoluble material in petroleum ether through a chromatographic column, separating the middle third of the said column, extracting the middle third of the said column with petroleum ether, whereby a solution of the blood cholesterol lowering substance and blood phospholipid lowering substance is obtained, and subjecting the said solution to chromatographic separation, whereby a solution of the blood cholesterol lowering substance free from the phospholipid lowering substance is obtained.

2. A process as defined in claim 1, wherein said organ is the posterior lobe of the pituitary gland.

3. A substance derived from animals capable of lowering the concentration of cholesterol in the blood of animals and having no effect on the concentration of phospholipids in the blood of animals; the substance having the following characteristics:

Elemental analysis: Percent
- Carbon _____ 83.46
- Hydrogen _____ 11.41
- Nitrogen _____ None
- Phosphorus _____ None
- Sulfur _____ None
- Halogens _____ None Melting point, 147° to 150° C.;
Unsaturation present, none;
Ketone groups present, none;
Ester groups present, none;
Phenolic groups present, none;
$[\alpha]_D^{28}$ in chloroform (c=2.0%), −39.75°;

Exhibiting characteristic absorption bands in the infrared region of the spectrum, when mulled in a pure hydrocarbon oil, at the following wave lengths in microns: 3.00, 6.00, 7.46, 7.62, 7.87, 7.99, 8.10, 8.26, 8.41, 8.56, 8.84, 9.05, 9.25, 9.48, 9.79, 9.84, 10.14, 10.44, 10.80, 11.33, 11.90, 12.52 and 13.52; and, Exhibiting characteristic absorption bands in the infrared region of the spectrum, when dissolved in carbon disulfide, at the following wave lengths in microns: 2.81, 7.23, 7.28, 7.31, 7.52, 7.68, 7.89, 7.97, 8.11, 8.24, 8.44, 8.47, 8.83, 9.04, 9.24, 9.54, 9.78, 9.89, 10.14, 10.49, 10.81, 12.51 and 13.60, said substance being obtained by treating a finely-divided organ selected from the group consisting of the anterior and posterior lobes of the pituitary gland, the liver, and the brain, at a pH within the range of about 7.0 to about 7.6 with an organic solvent selected from the group consisting of petroleum ether, ethyl ether, a liquid water miscible monohydric alcohol, a polyhydric alcohol, an aliphatic low molecular weight ketone, and a mixture of said solvents, the alcohols and ketones having no functional groups other than hydroxyl and carbonyl groups, removing the fraction soluble in the solvent, removing the solvent, adding chloroform to the residue obtained by removing the solvent in the amount of between 5 and 6 cc. of chloroform per gram of residue, separating the chloroform-insoluble material from the resulting mixture, passing a solution of the chloroform insoluble material in petroleum ether through a chromatographic column, separating the middle third of said column, extracting the middle third of said column with petroleum ether, whereby a solution of the blood cholesterol lowering substance and blood phospholipid lowering substance is obtained, and subjecting said solution to chromatographic separation, whereby a solution of the blood cholesterol lowering substance free from the phospholipid lowering substance is obtained.

4. A product as defined in claim 3, wherein said organ is the posterior lobe of the pituitary gland.

References Cited in the file of this patent

FOREIGN PATENTS 678,109    Great Britain _____ Aug. 27, 1952

OTHER REFERENCES

Chem. Abst., vol. 47, 1953, p. 4279a.
Shipley: Trans. of the N.Y. Acad. of Sciences, vol. 18, No. 2, Ser. II, December 1955, pp. 111, 119.